(12) United States Patent
Funke et al.

(10) Patent No.: US 7,678,015 B2
(45) Date of Patent: Mar. 16, 2010

(54) EFFICIENCY BASED INTEGRATED POWER TRAIN CONTROL SYSTEM

(75) Inventors: Steven J. Funke, Mapleton, IL (US); Jason K. Bloms, Peoria, IL (US); Thomas J. Crowell, Metamora, IL (US); Scott A. Leman, Eureka, IL (US); James R. Weber, Lacon, IL (US); Jeff Skorupski, Kalamazoo, MI (US); Tom Genise, Dearborn, MI (US); Rich Nellums, Portage, MI (US); Daniel G. Smedley, Farmington Hills, MI (US); Donald Speranza, Kalamazoo, MI (US)

(73) Assignees: Caterpillar Inc., Peoria, IL (US); Eaton Corporation, Cleveland, OH (US)

( * ) Notice: Subject to any disclaimer, the term of this patent is extended or adjusted under 35 U.S.C. 154(b) by 578 days.

(21) Appl. No.: 11/600,745

(22) Filed: Nov. 17, 2006

(65) Prior Publication Data

US 2007/0254771 A1 Nov. 1, 2007

Related U.S. Application Data

(60) Provisional application No. 60/795,570, filed on Apr. 28, 2006.

(51) Int. Cl.
*F16H 61/662* (2006.01)
*B60W 10/04* (2006.01)
*F16H 61/40* (2006.01)
*G06F 7/00* (2006.01)

(52) U.S. Cl. .............................. 477/43; 477/41; 477/69; 477/110; 701/56

(58) Field of Classification Search .................. 477/43, 477/41, 68, 69, 107, 110, 115; 475/208, 475/209; 701/51, 55, 56
See application file for complete search history.

(56) References Cited

U.S. PATENT DOCUMENTS 4,663,714 A 5/1987 Cornell et al.
4,679,396 A 7/1987 Heggie (Continued)

FOREIGN PATENT DOCUMENTS

CA 02191447 C 2/1995

(Continued)

OTHER PUBLICATIONS

International Search Report for PCT/US2007/010238, Oct. 1, 2007 (6 pages).

*Primary Examiner*—Roger Pang
(74) *Attorney, Agent, or Firm*—K&L Gates LLP

(57) ABSTRACT

A power train control system for a mobile machine is disclosed. The power train control system has a power source configured to produce a power output, a transmission device operatively connected to receive the power output and propel the mobile machine, and a control module. The control module is configured to receive an indication of a power demand, receive an indication of a current travel speed of the mobile machine, and reference the power demand and the current travel speed with a power train efficiency map to determine a desired power source speed. The power train control system is also configured to control operation of the transmission device to bring a speed of the power source within a predetermined amount of the desired power source speed.

17 Claims, 3 Drawing Sheets

U.S. PATENT DOCUMENTS

| | | |
|---|---|---|
| 4,774,858 A | 10/1988 | Ganoung |
| 4,793,217 A * | 12/1988 | Morisawa et al. .............. 477/41 |
| 4,964,318 A | 10/1990 | Ganoung |
| 5,161,433 A | 11/1992 | Sakakibara et al. |
| 5,413,540 A * | 5/1995 | Streib et al. .................... 477/43 |
| 5,417,621 A | 5/1995 | Tibbles |
| 5,514,047 A | 5/1996 | Tibbles et al. |
| 5,600,557 A * | 2/1997 | Ogawa ........................ 701/57 |
| 6,019,701 A * | 2/2000 | Mori et al. .................... 477/46 |
| 6,436,005 B1 | 8/2002 | Bellinger |
| 6,488,605 B2 | 12/2002 | van Druten et al. |
| 6,546,329 B2 | 4/2003 | Bellinger |
| 6,819,985 B2 | 11/2004 | Minagawa et al. |
| 6,957,139 B2 | 10/2005 | Bellinger |
| 2003/0109969 A1* | 6/2003 | Yamaguchi et al. ........... 701/22 |
| 2005/0049100 A1 | 3/2005 | Ai et al. |
| 2006/0014608 A1 | 1/2006 | Mitchell et al. |

FOREIGN PATENT DOCUMENTS

| | | |
|---|---|---|
| DE | 4312415 | 10/1994 |
| DE | 4432678 | 3/1996 |
| DE | 19757328 A1 | 6/1999 |
| DE | 10350308 A1 | 5/2005 |
| EP | 0967107 | 12/1999 |
| EP | 1754643 A1 | 2/2007 |
| FR | 2812249 A1 | 2/2002 |
| GB | 2365543 | 2/2002 |
| JP | 5312255 | 11/1993 |
| JP | 09242845 | 9/1997 |
| JP | 2237828 | 9/1999 |
| JP | 2000025490 | 1/2000 |
| WO | WO 99/56039 | 11/1999 |

* cited by examiner

EFFICIENCY BASED INTEGRATED POWER TRAIN CONTROL SYSTEM

RELATED APPLICATIONS

This application is based on and claims the benefit of priority from U.S. Provisional Application No. 60/795,570, filed Apr. 28, 2006, the contents of which are expressly incorporated herein by reference.

TECHNICAL FIELD

The present disclosure is directed to an efficiency based power train control system and, more particularly, to a control system for optimizing the efficiency of an integrated power source and transmission package.

BACKGROUND

Machines such as, for example, on-highway vocational vehicles, off-highway haul trucks, wheel loaders, motor graders, and other types of heavy machinery are used for a variety of tasks. These machines generally include a power source, which may embody, for example, an engine, such as a diesel engine, gasoline engine, or gaseous fuel-powered engine that provides the power required to complete these tasks. The power source may have a desired operating range, which may include those speeds and torques at which the power source experiences substantially stable and efficient operation. When operating outside the desired operating range, the power source can experience unstable operation such as, for example, overspeed situations, underspeed situations, lugging, and/or stalling. Efficiency losses may also be experienced by the power source when operating outside the desired operating range such as, for example, increased fuel consumption, increased exhaust emissions, increased power source temperatures, and/or decreased responsiveness.

To efficiently perform the variety of tasks assigned to the machine, the machine utilizes a transmission that is capable of transmitting the torque generated by the power source to one or more traction devices over a wide range of speeds. The transmission may include, for example, a mechanical transmission, an electric transmission, a hydraulic transmission, or any combination of these transmissions. The transmission may be capable of providing a desired output torque at a desired speed within its operating range by changing a ratio of an input rotation to an output rotation. Similar to the power source described above, the transmission may have a desired operating range at which the transmission experiences substantially stable and efficient operation. The desired operating range of the transmission may be different from the desired operating range of the power source. Similarly, a most stable or efficient operating range of a combined power source and transmission package may be different from either one of the individual transmission or power source desired operating ranges.

One method of attempting to improve a machine's efficiency is described in U.S. Pat. No. 6,436,005 (the '005 patent) issued to Bellinger on Aug. 20, 2002. The '005 patent describes a system having a control computer operable to determine a number of engine load/speed boundary conditions as a function of brake specific fuel consumption contours in relation to an engine output characteristic map. The control computer defines therefrom an undesirable engine operation region. As long as the engine is engaged with at least one of the gear ratios of a vehicle transmission, the control computer is operable to maintain or encourage engine operation outside of the undesirable engine operation region by changing an output ratio of the transmission.

Although the system of the '005 patent may provide a way to improve a vehicle's efficiency by using the vehicle transmission to maintain the engine within a region of desirable operation, it does not account for efficiency characteristics of the transmission. That is, although the control computer of the '005 patent may maximize efficiency of the engine by encouraging operation of the engine outside of the undesirable operation region, it is possible that the undesirable operation region of the engine overlaps with a desirable operation region of the transmission. In this situation, although engine efficiency may be improved, overall power train efficiency could be unaffected or even reduced.

The control system of the present disclosure solves one or more of the problems set forth above.

SUMMARY OF THE INVENTION

One aspect of the present disclosure is directed to a power train control system for a mobile machine. The power train control system includes a power source configured to produce a power output, a transmission device operatively connected to receive the power output and propel the mobile machine, and a control module. The control module is configured to receive an indication of a power demand, receive an indication of a current travel speed of the mobile machine, and reference the power demand and the current travel speed with a power train efficiency map to determine a desired power source speed. The power train control system is also configured to control operation of the transmission device to bring a speed of the power source within a predetermined amount of the desired power source speed.

In another aspect, the present disclosure is directed to a method of operating a power train of a mobile machine. The method includes combusting fuel within a power source to produce a power output and directing the power output to propel the mobile machine. The method also includes sensing a power demand, sensing a travel speed of the mobile machine, and referencing the sensed power demand and the sensed travel speed with a power train efficiency map to determine a desired power source speed. The method further includes controlling operation of a transmission device to bring a speed of the power source within a predetermined amount of the desired power source speed.

DETAILED DESCRIPTION

Figure 1:
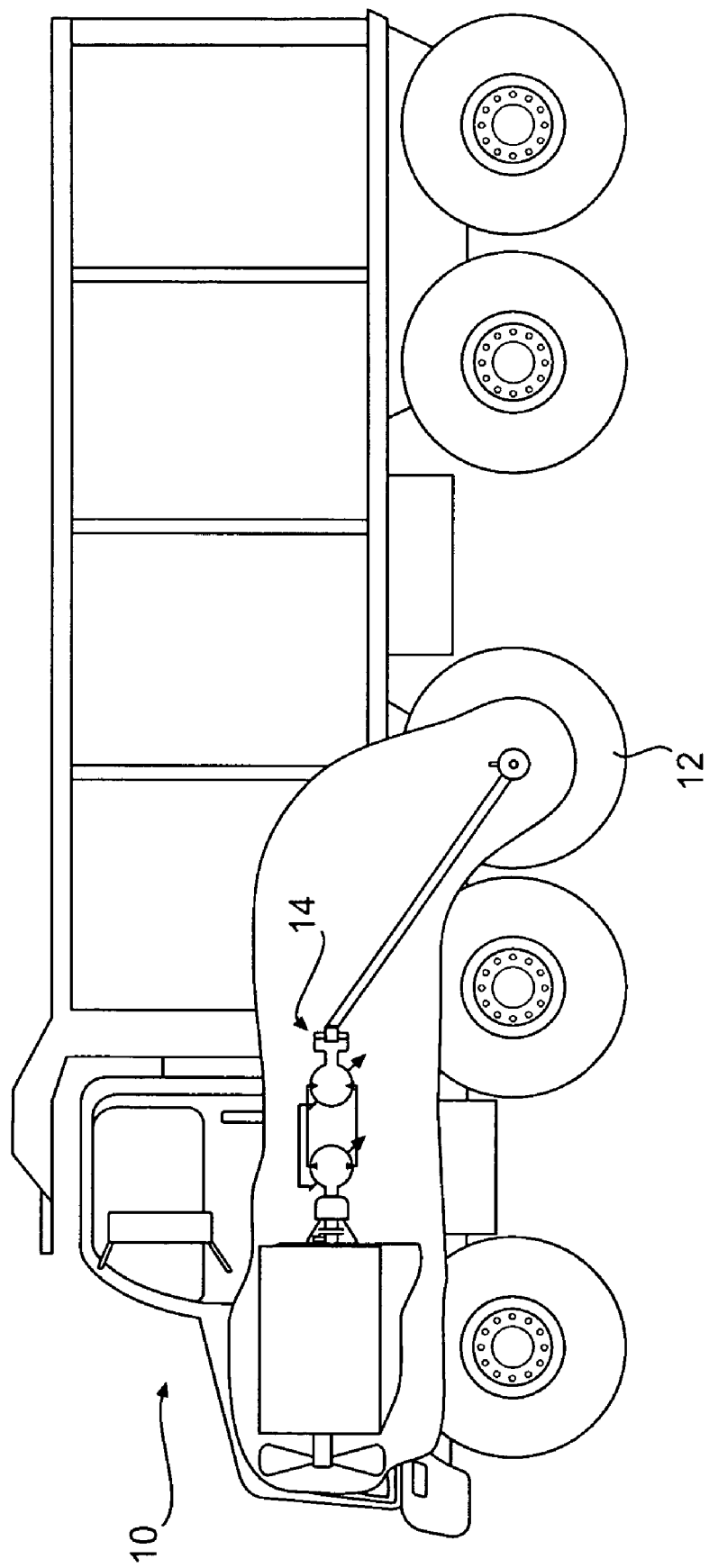
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the on-highway vocational vehicle depicted in FIG. 1, a bus, an off-highway haul truck, or any other type of mobile machine known in the art. Machine 10 may include one or more traction devices 12 operatively connected to and driven by a power train 14.

Traction devices 12 may embody wheels located on each side of machine 10 (only one side shown). Alternatively, traction devices 12 may include tracks, belts or other known traction devices. It is contemplated that any combination of the wheels on machine 10 may be driven and/or steered.

Power train 14 may be an integral package configured to generate and transmit power to traction devices 12. In particular, power train 14 may include a power source 16 operable to generate a power output, a transmission unit 18 connected to receive the power output and transmit the power output in a useful manner to traction devices 12, and a control module 20 configured to regulate the operation of power source 16 and transmission unit 18 in response to one or more input.

Figure 2:
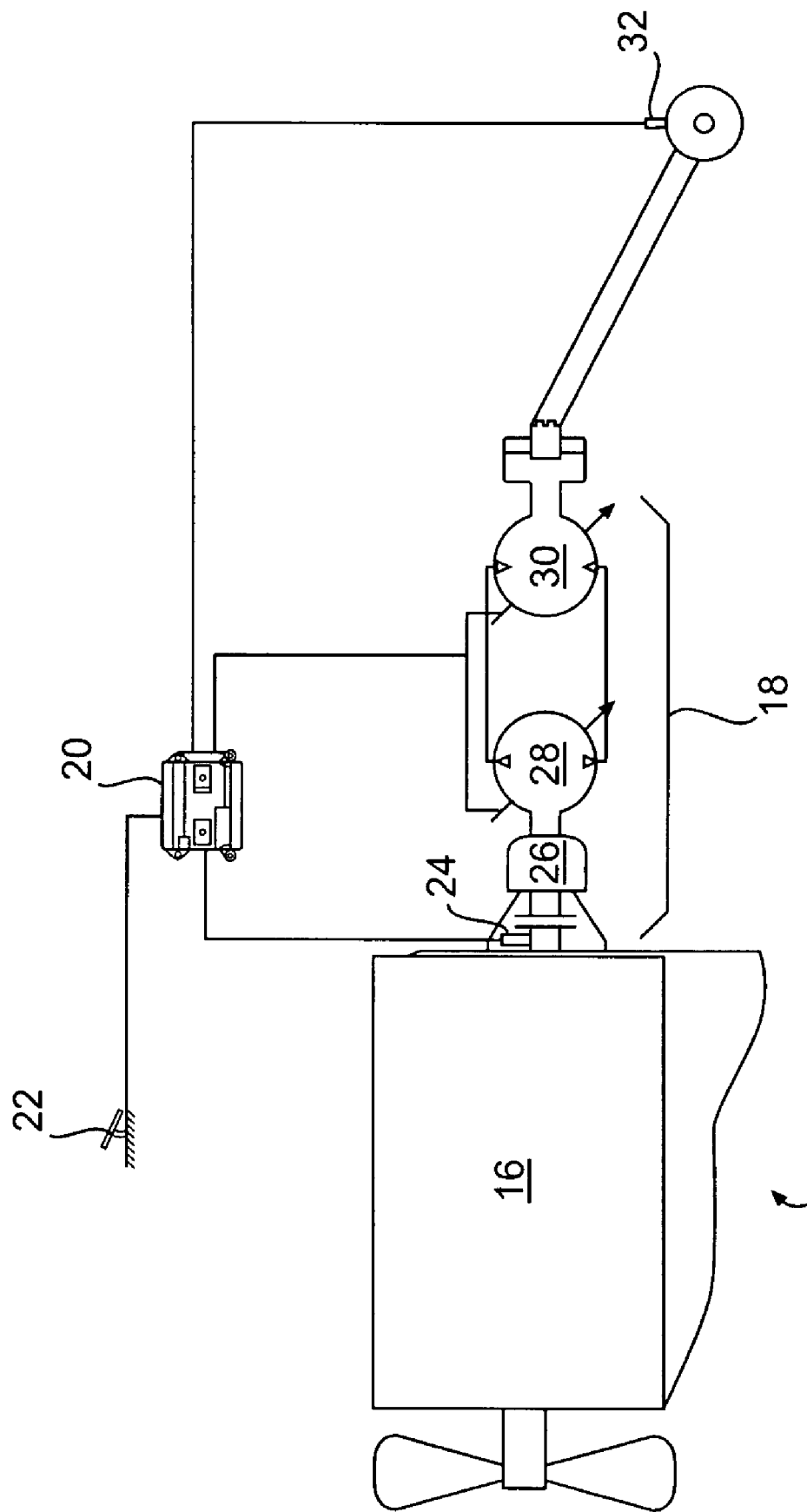
FIG. 2 is a diagrammatic illustration of an exemplary disclosed power train for used with the machine of FIG. 1.

As illustrated in FIG. 2, power source 16 may include an internal combustion engine having multiple subsystems that cooperate to produce mechanical or electrical power output. For the purposes of this disclosure, power source 16 is depicted and described as a four-stroke diesel engine. One skilled in the art will recognize, however, that power source 16 may be any other type of internal combustion engine such as, for example, a gasoline or a gaseous fuel-powered engine. The subsystems included within power source 16 may include, for example, a fuel system, an air induction system, an exhaust system, a lubrication system, a cooling system, or any other appropriate system.

Power source 16 may be at least partially controlled with an operator input device 22 that is configured to indicate a demanded machine power output. Operator input device 22 may embody any device capable of providing an electric signal signifying a desired machine power output such as, for example, an operator movable pedal having a minimum position and being movable through a range of positions to a maximum position. A sensor (not shown), such as a switch or potentiometer, may be provided to sense the position of operator input device 22 and to produce a demanded machine power signal responsive to the device's position. The desired machine power signal may be directed through control module 20 to power source 16 to control a flow of air and/or fuel into power source 16. It is contemplated that a desired machine power output may be determined in an alternative manner, if desired, such as, for example, by monitoring a fuel setting, a boost pressure, an exhaust temperature, a valve timing, an output torque, or any other suitable parameter of power source 16.

A sensor 24 may be associated with power source 16 to sense a rotational speed of power source 16. In one example, sensor 24 may embody a magnetic pickup type of sensor associated with a magnet embedded within a rotational component of power source 16 such as a crankshaft or flywheel. During operation of power source 16, sensor 24 may sense the rotating magnetic field produced by the magnet and generate a signal corresponding to the rotational speed of power source 16.

Transmission unit 18 may embody, for example, a continuously variable transmission (CVT). Transmission unit 18 may be any type of continuously variable transmission such as, for example, a hydraulic continuously variable transmission (as shown in FIGS. 1 and 2), an electric continuously variable transmission (not shown), or other configuration as would be apparent to one skilled in the art.

A continuously variable transmission generally consists of a driving element 28 and a driven element 30. In the hydraulic continuously variable transmission unit 18 illustrated in FIG. 2, driving element 28 is a pump, such as a variable displacement pump, and driven element 30 is a motor, such as a variable displacement motor. Driven element 30 may be fluidly connected to driving element 28 by conduits that supply and return fluid to and from driving element 28 and driven element 30, allowing driving element 28 to effectively drive driven element 30 by fluid pressure.

It is contemplated that transmission unit 18 may also include a fixed ratio transmission unit 26 having a plurality of selectable fixed forward gear ratios. A gear selector (not shown) may be provided for indicating which of the fixed forward gear ratios is desired and for generating a corresponding desired gear ratio signal directed through control module 20 to transmission unit 26. In an automatic-type transmission, as machine travel speed increases, control module 20 may effect shifting of transmission unit 26 in accordance with a shift map until a maximum desired gear is reached. In a manual-type transmission, control module 20 may effect the exact gear change selected by the operator as the operator makes the selection. It is contemplated that the gear selector may alternatively embody a mechanical device directly effecting gear shifting.

A sensor 32 may be associated with an output of transmission unit 18 to sense a travel speed of machine 10. In one example, sensor 32 may embody a magnetic pickup type of sensor associated with a magnet embedded within a rotational component such as an output shaft of transmission unit 18 or an input shaft of traction device 12. During operation of machine 10, sensor 32 may sense the rotating magnetic field produced by the magnet and generate a signal corresponding to the travel speed of machine 10.

Control module 20 may embody a single microprocessor or multiple microprocessors that include a means for controlling the operation of power train 14. Numerous commercially available microprocessors can be configured to perform the functions of control module 20. It should be appreciated that control module 20 could readily embody a general machine microprocessor capable of controlling numerous machine functions, an engine microprocessor, or a transmission microprocessor. Control module 20 may include a memory, a secondary storage device, a processor, and any other components for running an application. Various other circuits may be associated with control module 20 such as power supply circuitry, signal conditioning circuitry, solenoid driver circuitry, and other types of circuitry.

One or more power train efficiency maps relating the travel speed signal, the demanded power signal, and corresponding desired power source speed and efficiency values may be stored within the memory of control module 20. Each of these maps may relate to a different one of the fixed gear ratios associated with transmission unit 26 and may be in the form of tables, graphs, and/or equations. Each of the power train efficiency maps may include a compilation of power source efficiency data and transmission efficiency data collected from lab and/or field operation of power train 14 in a particular one of the fixed gear ratios. Control module 20 may reference these maps and control the operation of driving element 28 and driven element 30 to bring the operation of power source 16 in line with the desired power source speed. When control module 20 affects transmission unit 18 to bring the speed of power source 16 inline with the desired power source speed, the overall efficiency of power train 14 in the particular fixed gear ratio may be at a maximum for the demanded power output and given travel speed of machine 10, even if the individual power source and/or transmission efficiency may not be at a maximum.

Control module 20 may also be configured to affect shifting of transmission unit 26 between the fixed gear ratios, if the shift can improve the efficiency of power train 14 by a threshold amount. In particular, control module 20 may simultaneously reference multiple maps, including the map corresponding to the currently engaged one of the fixed gear ratios, the map corresponding to the upper bounding fixed gear ratio, and the map corresponding to the lower bounding fixed gear ratio. Control module 20 may compare the current demanded power and the current travel speed of machine 10 with each of these maps to determine the desired power source speed value resulting in the optimal efficiency of power train 14 for the particular fixed gear ratios. Control module 20 may compare the three resulting power train efficiencies and shift transmission unit 26 to the fixed gear ratio having the highest efficiency. However, control module 20 may only implement the efficiency improving shift, if the improvement in efficiency is greater than a threshold amount such as, for example, about 5%. In this manner, transmission unit 26 may be kept from continuously "hunting" between gear ratios.

Figure 3:
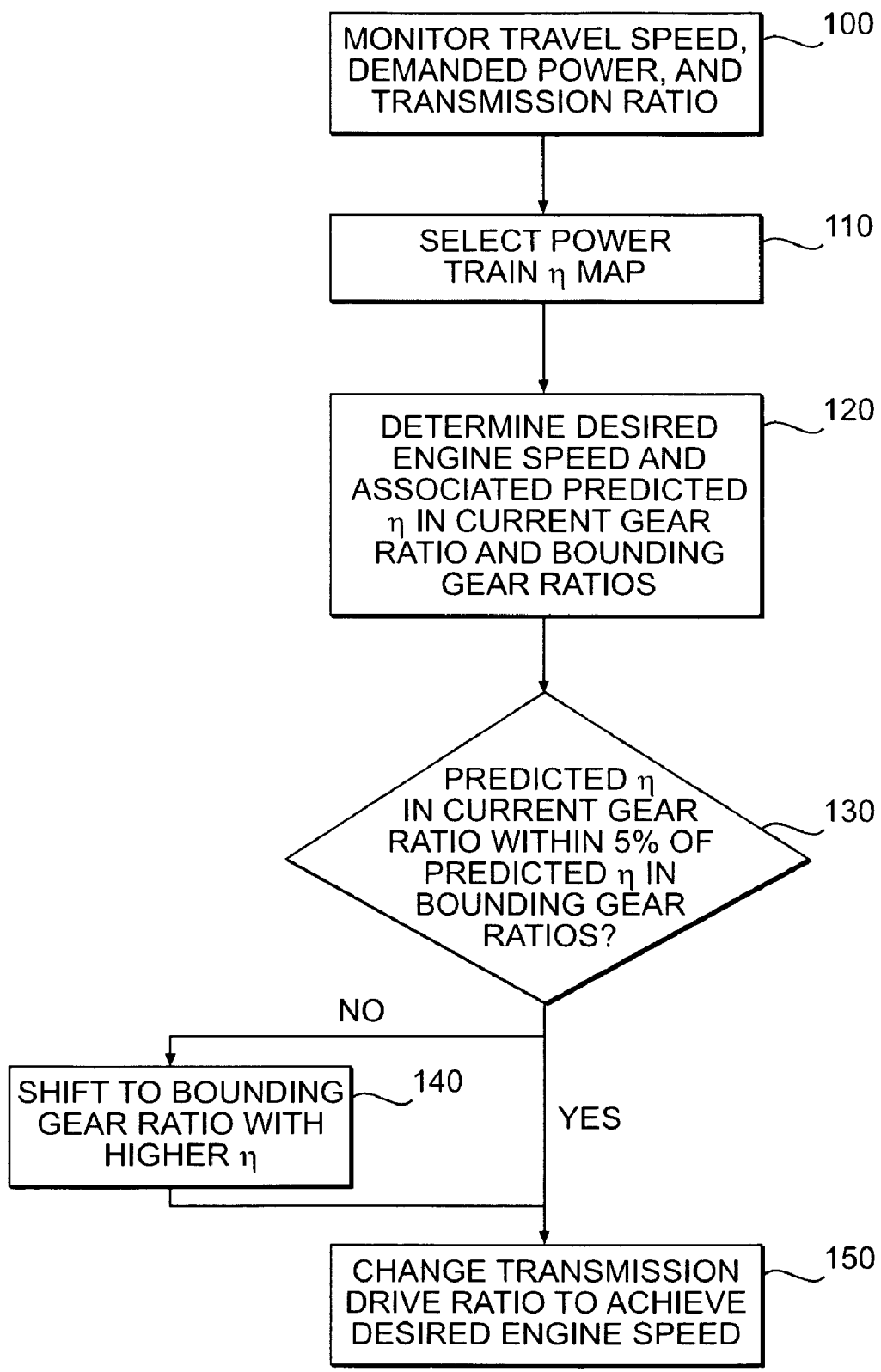
FIG. 3 is a flow chart depicting an exemplary disclosed method of operating the power train of FIG. 2.

FIG. 3 illustrates an exemplary method of operating power train 14. FIG. 3 will be discussed in the following section to further illustrate the disclosed system and its operation.

INDUSTRIAL APPLICABILITY

The disclosed power train control system may be applicable to any vehicle where overall efficiency of the vehicle is important. In particular, by regulating an associated power source and transmission in response to a combined efficiency characteristic rather than individual efficiency characteristics, overall vehicle efficiency may be improved. The operation of machine 10 will now be explained.

As indicated in the flowchart of FIG. 3, the first step in improving the operational efficiency of machine 10 may include control module 20 monitoring various signals generated by components of power train 14 (Step 100). In particular, control module 20 may monitor the travel speed signal from sensor 24, the demanded power signal from operator input device 22, and a signal from transmission unit 26 indicative of the currently engaged output ratio of transmission unit 26. In one example, the monitored travel speed may be about 10 mph, the demanded power may be about 300 hp, and the currently engaged output ratio may correspond with the third of six available fixed gear ratios. It is contemplated that other operational signals may also be monitored by control module 20.

In response to the values of the monitored signals, control module 20 may select for reference particular power train efficiency (η) maps from those maps stored within the memory of control module 20 (Step 110). Continuing with the example from above, control module 20 may select for reference the map corresponding to the third gear of transmission unit 26, the map corresponding to the upper bounding output ratio or the fourth gear of transmission unit 26, and the map corresponding to the lower bounding output ratio or second gear of transmission unit 26. If the currently engaged output ratio is the highest or lowest output ratio available from transmission unit 26 (the sixth or first gear in the example above), control module 20 may select for reference only two maps (e.g., the map corresponding with the currently engaged output ratio gear and the map corresponding with the closest available output ratio).

From each of the maps selected for reference, control module 20 may determine a desired engine speed and a corresponding predicted power train efficiency value (Step 220). That is, from the map corresponding to third gear, control module 20 may determine that the optimal power source speed at which power train 14 can transmit the demanded 300 hp to traction device 12, may be 1500 rpm, with an associated power train efficiency of about 45%. In this situation, it may be possible for power source 16 to generate 300 hp at a speed of 1800 rpm with a higher efficiency than it can at 1500 rpm. However, due to efficiency characteristics of transmission unit 18 when machine 10 is traveling at 10 mph, the overall efficiency of power train 14 may be lower when power source 16 is operated at 1800 rpm then at 1500 rpm. For this reason, the desired power source speed of 1500 rpm may be selected for control. From the maps corresponding to second and fourth gears, control module 20 may similarly determine desired power source speeds at which power train 14 can transmit 300 hp to traction device 12. As example only, the efficiency values corresponding with the desired power source speeds found from the second and fourth gear maps may be about 35% and 40%, respectively. It is contemplated that the optimum power source speed may be the same in each gear of transmission unit 26, but each gear will require a different output ratio of driving and driven elements 28, 30 to obtain that speed. There may only be one gear and output ratio of driving and driven elements 28, 30 that is optimum for a particular demanded power and travel speed. However, if the optimum power source speed for a given power demand and travel speed is different in different gears of transmission unit 26, the gear with the most efficient output ratio of driving and driven elements 28, 30 may be the best gear to use.

Once the predicted power train efficiency values corresponding to the desired power source speeds have been determined, control module 20 may establish if a shift of transmission unit 26 to one of the bounding available gears will improve the efficiency of power train 14. For example, if a shift of transmission unit 26 from third gear to second or fourth gears may improve the efficiency of power train 14 by at least 5%, control module 20 may affect the improving shift (Step 140). Because the predicted efficiencies of power train 14 operating in second and fourth gears are lower than the efficiency determined for operation in third gear of the example above, control module 20 may allow transmission unit 26 to remain in the third gear.

After shifting transmission unit 26 or determining that such a shift will insufficiently improve the efficiency of power train 14, control module 20 may regulate the output ratio of driving and/or driven elements 28, 30 to bring the speed of power source 16 within a predetermined amount of the desired engine speed (Step 150). For example, if the desired engine speed is 1500 rpm and the current engine speed is 1800 rpm, control module 20 may increase the displacement of driving element 28 and decrease the displacement of driven element 30 such that a greater torque load is transferred from traction device 12 to power source 16. The greater torque load may cause the speed of power source 16 to fall to within an acceptable predetermined amount of 1500 rpm. Conversely, to increase the speed of power source 16, the displacement of driving element 28 may be reduced while the displacement of driven element 30 may be simultaneously increased to reduce the torque load transferred to power source 16.

Because power source 16 and transmission unit 18 may be controlled according to an integrated power train efficiency rather than individual component efficiencies, the overall efficiency of machine 10 may improved. In particular, there may be situations in which a most efficient operating point of power source 16 is not the most efficient operating point of transmission unit 18. In this situation, if power source 16 were operated according to it's optimal efficiency setting and transmission unit 18 were operated according to it's optimal efficiency setting, the overall efficiency of power train 14 might not be maximized. Because control module 20 may take into account the combined efficiency of power source 16 and transmission unit 18, the efficiency of the integrated power train may be at an optimal setting, even though the individual efficiencies of power source 16 and transmission unit 18 may not be optimal.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A power train control system for a mobile machine, comprising:
    a power source configured to produce a power output;
    a transmission device operatively connected to receive the power output and propel the mobile machine; wherein the transmission device comprises a fixed ratio transmission unit comprising a plurality of available fixed output ratios; and
    a control module configured to:
        receive an indication of a power demand;
        receive an indication of a current travel speed of the mobile machine;
        reference the power demand and the current travel speed with a power train efficiency map to determine a first desired power source speed; and
        control operation of the transmission device to bring a speed of the power source within a predetermined amount of the first desired power source speed;
    wherein the control module comprises a plurality of power train efficiency maps, each of the plurality of power train efficiency maps corresponding with one of the plurality of available fixed output ratios, and
    wherein the first desired power source speed is associated with a current fixed output ratio, and wherein the control module is configured to:
        determine a second desired power source speed associated with an upper bounding fixed output ratio, and a third desired power source speed associated with a lower bounding fixed output ratio;
        compare a power train efficiency value corresponding to the first desired power source speed with a power train efficiency value corresponding to the second desired power source speed and a power train efficiency value corresponding to the third desired power source speed; and
        shift the fixed ratio transmission unit to the one of the fixed output ratios having the corresponding highest power train efficiency.

2. The power train control system of claim 1, wherein the transmission device comprises a continuously variable transmission.

3. The power train control system of claim 1, wherein the control module is configured to shift the fixed ratio transmission unit to the one of the fixed output ratios only if the corresponding power train efficiency value is greater than the remaining power train efficiency values by a threshold amount.

4. The power train control system of claim 1, comprising an operator input device configured to generate the indication of a power demand.

5. The power train control system of claim 1, wherein the power train efficiency map comprises a compilation of efficiency data from both the power source and the transmission device.

6. The power train control system of claim 3, wherein the threshold amount is about 5%.

7. A power train control system for a mobile machine, comprising:
    a power source configured to produce a power output;
    a transmission device operatively connected to receive the power output and propel the mobile machine, wherein the transmission device comprises a fixed ratio transmission unit comprising a plurality of available fixed output ratios; and
    a control module configured to:
        receive an indication of a power demand;
        receive an indication of a current travel speed of the mobile machine;
        reference the power demand and the current travel speed with a power train efficiency map to determine a first desired power source speed; and
        control operation of the transmission device to bring a speed of the power source within a predetermined amount of the first desired power source speed;
    wherein the control module comprises a plurality of power train efficiency maps, each of the plurality of power train efficiency maps corresponding with one of the plurality of available fixed output ratios, and
    wherein the first desired power source speed is associated with a current fixed output ratio, and wherein the control module is configured to:
        determine at least a second desired power source speed associated with at least one of an upper bounding fixed output ratio and a lower bounding fixed output ratio;
        compare a power train efficiency value corresponding to the first desired power source speed with a power train efficiency value corresponding to the at least second desired power source speed; and
        shift the fixed ratio transmission unit to the fixed output ratio having the corresponding highest power train efficiency when the corresponding power train efficiency value is greater than the remaining power train efficiency value by a threshold amount.

8. The power train control system of claim 7, wherein the transmission device comprises a continuously variable transmission.

9. The power train control system of claim 7, wherein the threshold amount is about 5%.

10. The power train control system of claim 7, comprising an operator input device configured to generate the indication of a power demand.

11. The power train control system of claim 7, wherein the power train efficiency map comprises a compilation of efficiency data from both the power source and the transmission device.

12. A mobile machine, comprising:
    a power train control system, comprising:
        a power source configured to produce a power output;
        a transmission device operatively connected to receive the power output and propel the mobile machine, wherein the transmission device comprises a fixed ratio transmission unit comprising a plurality of available fixed output ratios; and
        a control module configured to:
            receive an indication of a power demand;
            receive an indication of a current travel speed of the mobile machine;

reference the power demand and the current travel speed with a power train efficiency map to determine a first desired power source speed; and control operation of the transmission device to bring a speed of the power source within a predetermined amount of the first desired power source speed;

wherein the control module comprises a plurality of power train efficiency maps, each of the plurality of power train efficiency maps corresponding with one of the plurality of available fixed output ratios, and wherein the first desired power source speed is associated with a current fixed output ratio, and wherein the control module is configured to:

determine a second desired power source speed associated with an upper bounding fixed output ratio, and a third desired power source speed associated with a lower bounding fixed output ratio;

compare a power train efficiency value corresponding to the first desired power source speed with a power train efficiency value corresponding to the second desired power source speed and a power train efficiency value corresponding to the third desired power source speed; and shift the fixed ratio transmission unit to the one of the fixed output ratios having the corresponding highest power train efficiency.

13. The mobile machine of claim 12, wherein the transmission device comprises a continuously variable transmission.

14. The mobile machine of claim 12, wherein the control module is configured to shift the fixed ratio transmission unit to the one of the fixed output ratios when the corresponding power train efficiency value is greater than the remaining power train efficiency values by a threshold amount.

15. The mobile machine of claim 14, wherein the threshold amount is about 5%.

16. The mobile machine of claim 12, comprising an operator input device configured to generate the indication of a power demand.

17. The mobile machine of claim 12, wherein the power train efficiency map comprises a compilation of efficiency data from both the power source and the transmission device.

* * * * *